(12) United States Patent
Kellner et al.

(10) Patent No.: US 12,520,839 B2
(45) Date of Patent: Jan. 13, 2026

(54) METHODS AND COMPOSITIONS FOR CRYOPRESERVATION OF CELL THERAPIES

(71) Applicant: The George Washington University, Washington, DC (US)

(72) Inventors: Joshua Kellner, Richmond, TX (US); Eric Yvon, Bethesda, MD (US)

(73) Assignee: The George Washington University, Washington, DC (US)

( * ) Notice: Subject to any disclaimer, the term of this patent is extended or adjusted under 35 U.S.C. 154(b) by 638 days.

(21) Appl. No.: 17/881,453

(22) Filed: Aug. 4, 2022

(65) Prior Publication Data

US 2022/0394971 A1 Dec. 15, 2022

Related U.S. Application Data

(63) Continuation of application No. PCT/US2021/017081, filed on Feb. 8, 2021.

(60) Provisional application No. 62/971,142, filed on Feb. 6, 2020.

(51) Int. Cl.
*A01N 1/126* (2025.01)
*A01N 1/125* (2025.01)

(52) U.S. Cl.
CPC ............ *A01N 1/126* (2025.01); *A01N 1/125* (2025.01)

(58) Field of Classification Search
None
See application file for complete search history.

(56) References Cited

U.S. PATENT DOCUMENTS

| | | | |
|---|---|---|---|
| 5,827,741 A * | 10/1998 | Beattie | A61K 35/19 435/375 |
| 7,446,174 B2 * | 11/2008 | Desjarlais | A61K 38/191 435/7.1 |
| 10,292,382 B2 | 5/2019 | Bouaita et al. | |
| 2005/0250088 A1 | 11/2005 | Boldt | |
| 2007/0259327 A1 | 11/2007 | Iwanaga et al. | |
| 2009/0162878 A1 * | 6/2009 | Kim | G01N 33/6896 435/7.1 |

FOREIGN PATENT DOCUMENTS

| | | |
|---|---|---|
| WO | WO 2013-125878 | 8/2013 |
| WO | WO 2017-197379 | 11/2017 |

* cited by examiner

*Primary Examiner* — Blaine Lankford
(74) *Attorney, Agent, or Firm* — Kory D. Christensen

(57) ABSTRACT

The disclosure provides for cryopreservation compositions and methods of use thereof. Aspects of the present disclosure provide for cryopreservation compositions useful in the freezing and thawing of cell therapies. Other aspects of the present disclosure provide for systems for use in the cryopreservation cell therapies. Still other aspects of the present disclosure provide for methods of cryopreserving cell therapies.

20 Claims, 7 Drawing Sheets

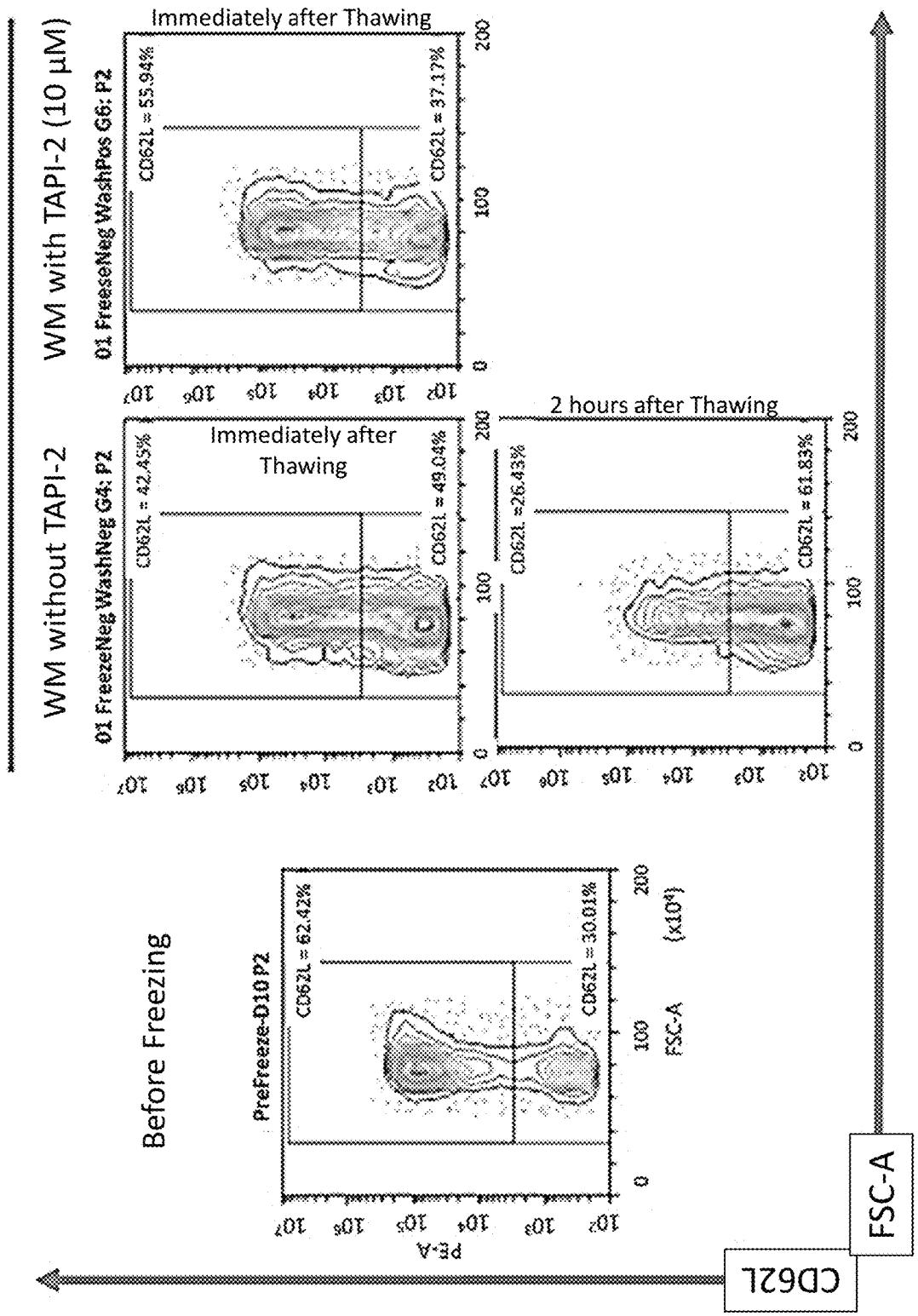

NK-Cell Recovery

T-Cell Recovery

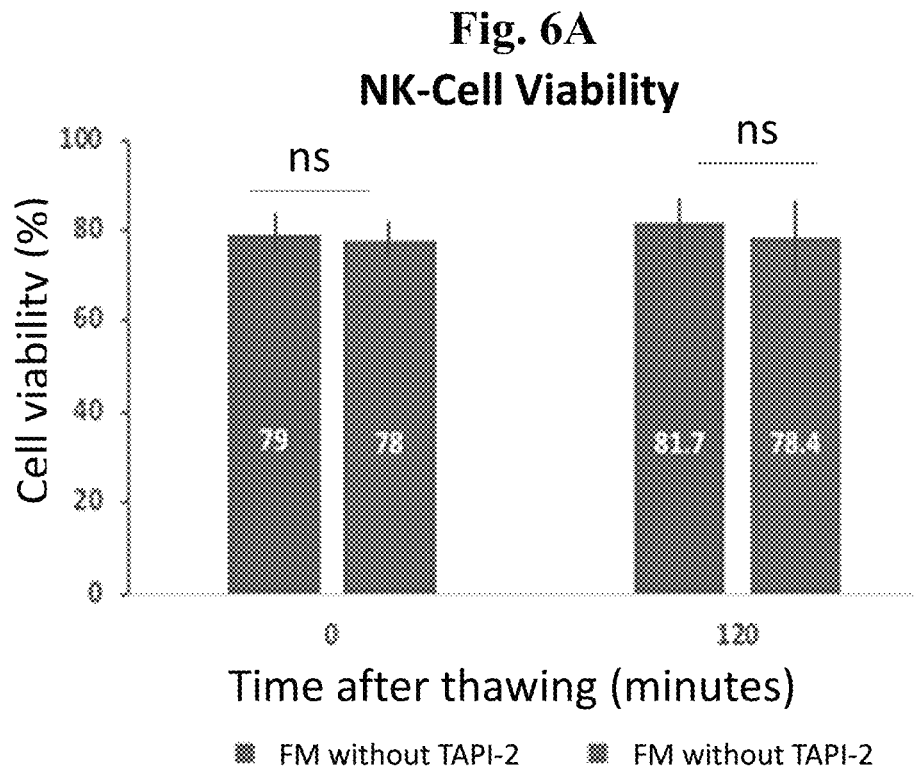
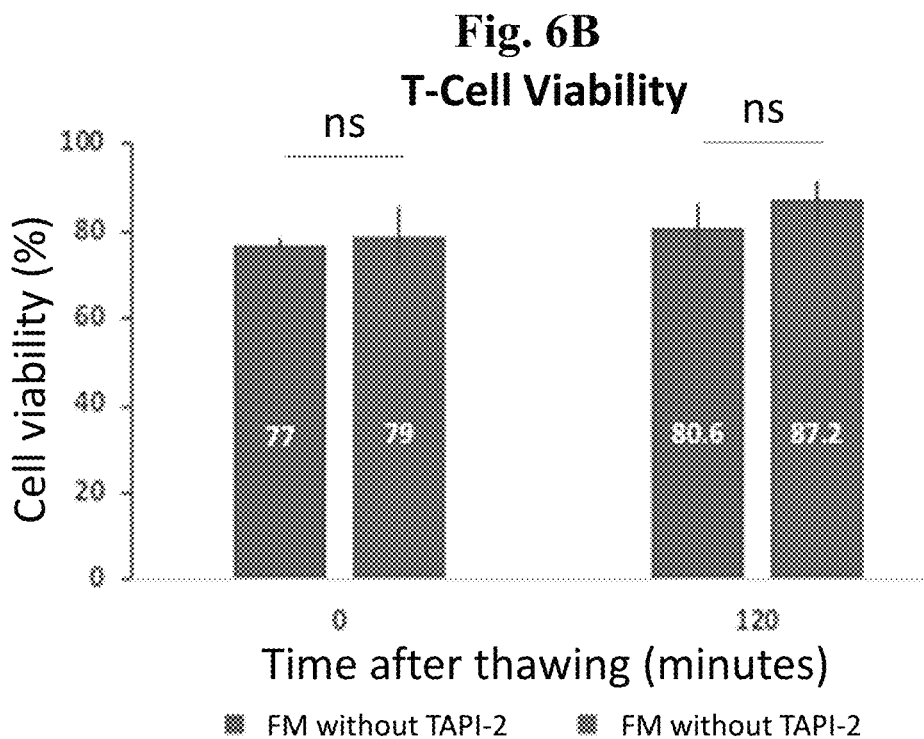

METHODS AND COMPOSITIONS FOR CRYOPRESERVATION OF CELL THERAPIES

CROSS-REFERENCE TO RELATED PATENT APPLICATION

This application is a continuation of PCT Application No. PCT/US2021/017081, filed Feb. 8, 2021 for METHODS AND COMPOSITIONS FOR CRYOPRESERVATION FOR CELL THERAPIES, which claims the benefit of U.S. Patent Application Ser. No. 62/971,142, filed on Feb. 6, 2020, each of which is incorporated herein by reference in its entirety.

FIELD

The present disclosure is directed to compositions for cryopreservation and subsequent thawing of cell therapies and methods of use thereof.

BACKGROUND

Cryopreservation is the process of using ultra-low temperatures to preserve living cells and tissues for a prolonged time period. Cryopreservation is an essential and critical step in the preparation of cellular products either for research or for clinical application. Cell therapy (also called cellular therapy, cell transplantation, or cytotherapy) is a therapy in which viable cells are injected, grafted or implanted into a subject in order to effectuate a medicinal effect. In the production of cell therapies, cells may be selectively isolated from peripheral blood or tumor tissues, genetically engineered, activated and expanded to relevant doses, harvested, packaged and cryopreserved, before transporting the final cellular product to the site of clinical administration. At the clinical site, the cryopreserved cells are eventually thawed and infused into the subjects waiting for treatment.

However, the process of cryopreserving live cells can affect the quality of the cellular product and damage the cells if not performed according to validated processes. Standard cooling profiles may not be universally applicable to preserve cells of various tissue and donor source, as they may have differing biological responses to cryopreservation. Even when proper cryopreservation methods are used, cryopreserved cells can lose their original property or phenotype and lose—partially or completely—their function. For instance, Regulatory T cells (Treg) and Natural Killer cells (NK cells) are not able to exert their fully regulatory or killing property after thawing. As such, there is a need in the art for new cryopreservation reagents and methods of use to insure that cellular products for cell therapies are robust and reproducible.

BRIEF SUMMARY

The disclosure provides for cryopreservation compositions and methods of use thereof. Some aspects of the present disclosure provide for cryopreservation compositions having a cryopreservation medium having at least one ADAM metallopeptidase domain 17 (ADAM17) inhibitor. In some embodiments, cryopreservation compositions herein can further include one or more cryoprotectants, a serum, or any combination thereof in an aqueous solution. In some embodiments, cryopreservation compositions herein can include one or more cryoprotectants including sucrose, dextran, trehalose, percoll, polyethylene glycol, polyvinyl pyrrolidone, serum albumin, ficol, maltose, polyvinylalcohol (PVA), ethylene glycol, glycerol, dimethyl sulfoxide (DMSO), or any combinations thereof. In some embodiments, cryopreservation compositions herein can include DMSO.

In some embodiments, cryopreservation compositions herein can include a serum having albumins, growth factors, growth inhibitors, or any combinations thereof. In some embodiments, cryopreservation compositions herein can include fetal bovine serum (FBS).

In some embodiments, cryopreservation compositions herein can have an aqueous solution including phosphate buffered saline (PBS), Dulbecco's Modified Eagle's Medium (DMEM), IDMEM (Iscove's DMEM with L-glutamine and 25 mM HEPES), Minimum Essential Media (MEM), RPMI (Roswell Park Memorial Institute) 1640, McCoy's 5A medium (or RPMI 1630), Ham's F-12, Normosol R, lactated Ringer's, Hank's balanced salt solution (HBSS), or any combinations thereof. In some embodiments, cryopreservation compositions herein can include RPMI.

In some embodiments, cryopreservation compositions herein can have at least one ADAM17 inhibitor including Nitroarginine analog A, GW3333, TMI-1, BMS-561392, DPC-3333, TMI-2, BMS-566394, TMI-005, apratastat, GW4459, W-3646, IK-682, GI-5402, GI-245402, BB-2983, DPC-A38088, DPH-067517, R-618, INCB003619, INCB007839, INCB7839, TAPI-0, TAPI-1, TAPI-2, ZLDI-8, CH-138, or any combinations thereof. In some embodiments, cryopreservation compositions herein can have between about 10 nM to about 100 μM of the at least one ADAM17 inhibitor. In some embodiments, cryopreservation compositions herein can have the ADAM17 inhibitor TAPI-2.

In some embodiments, cryopreservation compositions herein can further include water, saline, pH buffering agents, carriers, excipients, stabilizers, buffers, reagents, amino acids, carbohydrates, vitamins, antibiotics, or any combinations thereof.

Some other aspects of the present disclosure provide for systems for use in the cryopreservation of one more cells. In some embodiments, systems herein can encompass a cryopreservation medium disclosed herein having at least one ADAM metallopeptidase domain 17 (ADAM17) inhibitor; and a washing medium optionally having at least one ADAM metallopeptidase domain 17 (ADAM17) inhibitor.

In some embodiments, washing medium compositions herein can further include one or more cryoprotectants, a serum, or any combination thereof in an aqueous solution. In some embodiments, washing medium compositions herein can have at least one ADAM17 inhibitor including Nitroarginine analog A, GW3333, TMI-1, BMS-561392, DPC-3333, TMI-2, BMS-566394, TMI-005, apratastat, GW4459, W-3646, IK-682, GI-5402, GI-245402, BB-2983, DPC-A38088, DPH-067517, R-618, INCB003619, INCB007839, INCB7839, TAPI-0, TAPI-1, TAPI-2, ZLDI-8, CH-138, or any combinations thereof. In some embodiments, washing medium compositions herein can have between about 10 nM to about 100 μM of the at least one ADAM17 inhibitor. In some embodiments, washing medium compositions herein can have the ADAM17 inhibitor TAPI-2.

Some other aspects of the present disclosure provide for methods of cryopreserving cells. In some embodiments, methods herein can include freezing a suspension having cells in a cryopreservation medium disclosed herein wherein the cryopreservation medium can have at least one ADAM metallopeptidase domain 17 (ADAM17) inhibitor, and the cells can be one or more cell types for use in a cell therapy.

In some embodiments, methods herein can include thawing the suspension after freezing and washing thawed suspension in a washing medium, the washing medium optionally having at least one ADAM metallopeptidase domain 17 (ADAM17) inhibitor.

In some embodiments, methods herein can be performed with one or more cell types for use in a cell therapy which can include multipotent cells, progenitor cells, immune cells, or any combination thereof. In some embodiments, methods herein can be performed with one or more immune cells types for use in a cell therapy which can include lymphocytes, neutrophils, granulocytes, mast cells, monocytes, macrophages, dendritic cells, or any combination thereof. In some embodiments, methods herein can be performed with one or more immune cells types for use in a cell therapy which can include CAR-T cells, NK cells, engineered TCRs, TIL, Tregs, CAR-Tregs, CAAR-T cells, T cells, monocytes, B lymphocytes, T lymphocytes, which are natural or genetically modified, such as regulatory T lymphocytes, cytotoxic T lymphocytes, helper T lymphocytes, chimeric antigen receptor (CAR) T lymphocytes, or any combination thereof.

In some embodiments, methods herein can result in the cells in a thawed suspension having one or more surface markers that were present prior to freezing. In some embodiments, methods herein can result in the cells in a thawed suspension having one or more surface markers including CD16, CD62L, CD30, CD40, CD44, IL15Ra, notch expression markers, or any combination thereof that were present prior to freezing.

In some embodiments, methods herein can result in the cells in a thawed suspension having same activity that the cells had prior to freezing. In some embodiments, methods herein can result in the cells in a thawed suspension having same viability that the cells had prior to freezing.

In some embodiments, methods herein can result in cells that can be administered to a subject in need of at least one cell therapy. In some embodiments, methods herein can result in cells that can be administered to a subject in need of at least one cell therapy wherein the thawed cells can be washed in a washing medium disclosed herein having at least one ADAM17 inhibitor. In some embodiments, methods herein can result in cells that can be administered to a subject in need of at least one cell therapy wherein the thawed cells can be washed in a washing medium disclosed herein not having ADAM17 inhibitor.

On some other aspects, kit are contemplated herein for use in practicing any other the methods disclosed herein.

Additional variations and features are set forth in part in the description that follows, and will become apparent to those skilled in the art upon examination of the specification or may be learned by the practice of the disclosed subject matter. A further understanding of the nature and advantages of the disclosure may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as variations of the disclosure and should not be construed as a complete recitation of the scope of the disclosure, wherein:

FIG. 4 illustrates an example of T cells cryopreserved in a freezing medium containing TAPI-2 followed by thawing in a washing medium having TAPI-2 (Thaw+) and not having TAPI-2 (Thaw−) in accordance with certain aspects of the present disclosure.

FIGS. 6A and 6B illustrate examples of cell viability of cryopreserved NK cells and T cells assessed immediately after thawing from a freezing medium having and not having TAPI-2 in accordance with certain aspects of the present disclosure

DETAILED DESCRIPTION

Figure 1:
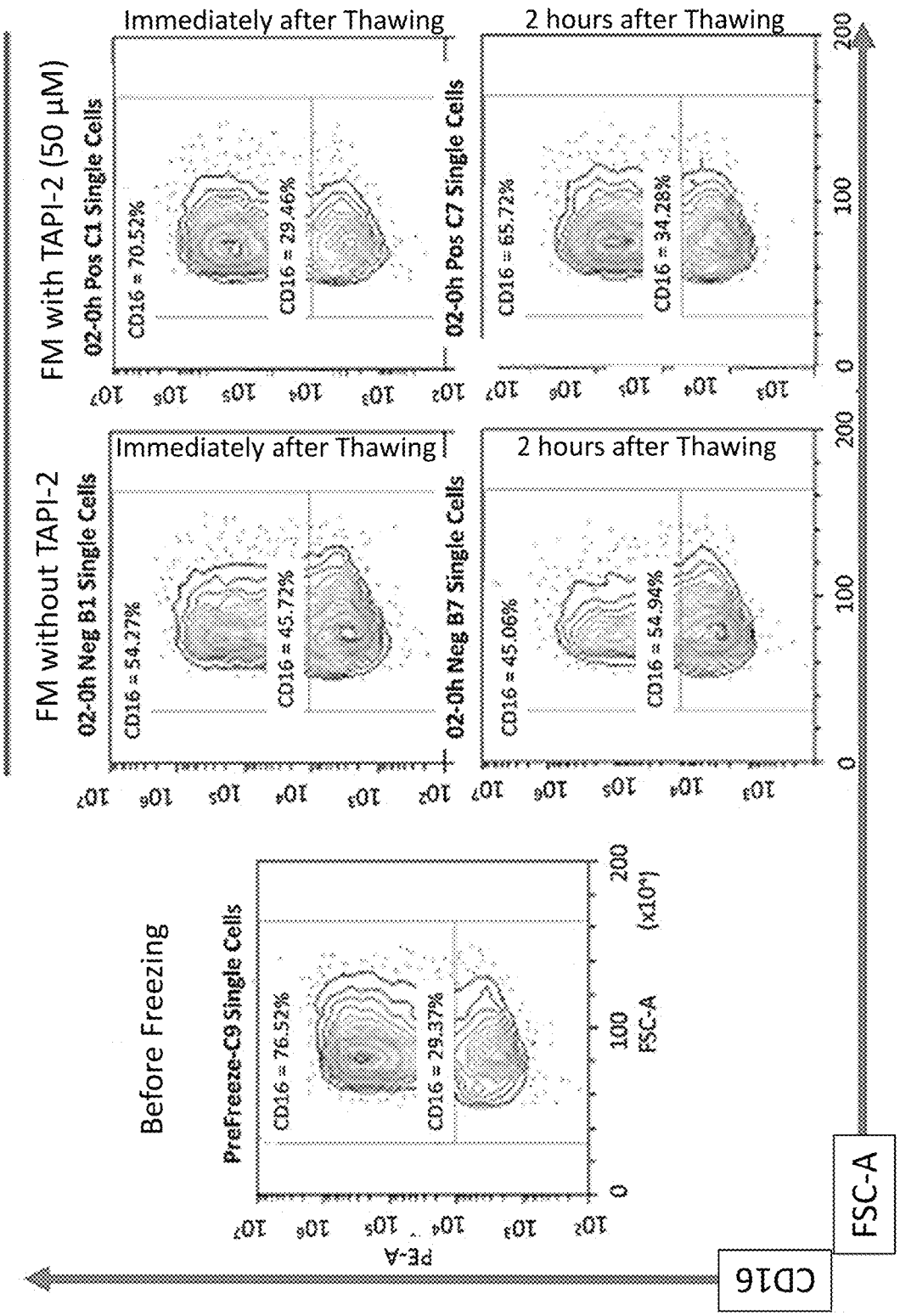
FIG. 1 illustrates an example of NK cells cryopreserved in a freezing medium containing TAPI-2 retaining expression of CD16 in accordance with certain aspects of the present disclosure.

The disclosure may be understood by reference to the following detailed description, taken in conjunction with the drawings as described below. It is noted that, for purposes of illustrative clarity, certain elements in various drawings may not be drawn to scale.

Disclosed herein are cryopreservation compositions and methods of use thereof. The present disclosure is based, at least in part, on the surprising discovery that a cryopreservation medium having an ADAM metallopeptidase domain 17 (ADAM17) inhibitor can preserve the cell surface marker CD16 on NK cells and CD62L on T cells during the process of cryopreservation and thawing. Accordingly, aspects of the present disclosure provide for cryopreservation compositions useful in the freezing and thawing of cell therapies. Other aspects of the present disclosure provide for systems for use in the cryopreservation cell therapies. Still other aspects of the present disclosure provide for methods of cryopreserving cell therapies.

I. Terminology

The phraseology and terminology employed herein are for the purpose of description and should not be regarded as limiting. For example, the use of a singular term, such as, "a" is not intended as limiting of the number of items. Also, the use of relational terms such as, but not limited to, "top," "bottom," "left," "right," "upper," "lower," "down," "up," and "side," are used in the description for clarity in specific reference to the figures and are not intended to limit the scope of the present inventive concept or the appended claims.

Further, as the present inventive concept is susceptible to embodiments of many different forms, it is intended that the present disclosure be considered as an example of the principles of the present inventive concept and not intended to limit the present inventive concept to the specific embodiments shown and described. Any one of the features of the present inventive concept may be used separately or in combination with any other feature. References to the terms "embodiment," "embodiments," and/or the like in the description mean that the feature and/or features being referred to are included in, at least, one aspect of the description. Separate references to the terms "embodiment," "embodiments," and/or the like in the description do not necessarily refer to the same embodiment and are also not mutually exclusive unless so stated and/or except as will be readily apparent to those skilled in the art from the description. For example, a feature, structure, process, step, action, or the like described in one embodiment may also be included in other embodiments, but is not necessarily included. Thus, the present inventive concept may include a variety of combinations and/or integrations of the embodiments described herein. Additionally, all aspects of the present disclosure, as described herein, are not essential for its practice. Likewise, other systems, methods, features, and advantages of the present inventive concept will be, or become, apparent to one with skill in the art upon examination of the figures and the description. It is intended that all such additional systems, methods, features, and advantages be included within this description, be within the scope of the present inventive concept, and be encompassed by the claims.

Any term of degree such as, but not limited to, "substantially" as used in the description and the appended claims, should be understood to include an exact, or a similar, but not exact configuration. For example, "a substantially planar surface" means having an exact planar surface or a similar, but not exact planar surface. Similarly, the terms "about" or "approximately," as used in the description and the appended claims, should be understood to include the recited values or a value that is three times greater or one third of the recited values. For example, about 3 mm includes all values from 1 mm to 9 mm, and approximately 50 degrees includes all values from 16.6 degrees to 150 degrees. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The terms "comprising," "including" and "having" are used interchangeably in this disclosure. The terms "comprising," "including" and "having" mean to include, but not necessarily be limited to the things so described.

Lastly, the terms "or" and "and/or," as used herein, are to be interpreted as inclusive or meaning any one or any combination. Therefore, "A, B or C" or "A, B and/or C" mean any of the following: "A," "B" or "C"; "A and B"; "A and C"; "B and C"; "A, B and C." An exception to this definition will occur only when a combination of elements, functions, steps or acts are in some way inherently mutually exclusive.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments described herein are capable of operation in other sequences than described or illustrated herein.

Unless otherwise defined, all terms used in disclosing the concepts described herein, including technical and scientific terms, have the meaning as commonly understood by one of ordinary skill in the art. By means of further guidance, definitions for the terms used in the description are included to better appreciate the teaching of the present disclosure.

The terms or definitions used herein are provided solely to aid in the understanding of the teachings provided herein.

The term "stem cell" as used herein refers to either pluripotent or multipotent stem cells. The term "pluripotent stem cell" as used herein refers to cells having the ability of self renewal and the potential to differentiate in any type of cell. The term "multipotent stem cell" as used herein refers to stem cells which have the ability of self renewal and have the potential to differentiate into a limited number of cell types, typically within one category of cells such as blood cells (lymphocytes, monocytes, neutrophils), brain cells (neurons, glial cells etc.), bone cells (osteoblasts, osteoclasts etc) The term "progenitor cell" as used herein refers to a stem cell which is able to differentiate into a certain type of cell and which has limited or no ability to self-renew.

The term, "slow freezing method" as used herein refers to a set of well-established techniques wherein a cell-containing sample is cooled at a controlled rate before final cryopreservation in liquid nitrogen or the like. Lethal intracellular freezing is avoided by cooling the cells slow enough to permit sufficient water to leave the cells during progressive freezing of the extracellular fluid. Preferably, the cooling rate is about −0.1° C./min to −10° C./min, more preferably between −0.2° C./min to −5° C./min, for example about 1° C. per minute. Slow-freezing is also known in the art as "Slow programmable freezing" and "Controlled-rate freezing", as opposed to vitrification methods.

The term "vitrification" as used herein refers to cryopreservation techniques wherein a sample is cooled at an extremely fast rate, e.g. by directly contacting the sample with liquid nitrogen, such that the sample is typically frozen within a few seconds. At such cooling rate the sample medium vitrifies, i.e. it forms an amorphous "solid state" instead of crystallizing.

II. Compositions

Aspects of the present disclosure provide for cryopreservation compositions useful in the freezing and thawing of cell therapies. The term "cryopreservation medium" as used herein refers to a liquid medium which can be used to treat the cells prior to freezing.

In some embodiments, a cryopreservation medium herein can contain one or more cryoprotectants. A "cryoprotectants" as used herein is a reagent that can ensure the protection of the cells or tissues from freezing damage. In some examples, cryopreservation mediums herein can have about 0.5% to about 90% total cryoprotectant by weight of the composition. In some examples, cryopreservation mediums herein can have about 0.5% about 5%, about 10%, about 15%, about 20%, about 25%, about 30%, about 40%, about 50%, about 60%, about 70%, about 80%, or about 90% total cryoprotectant by weight of the composition. Examples of suitable non-permeating cryoprotectants include, but are not limited to, sucrose, dextran, trehalose, percoll, polyethylene glycol, polyvinyl pyrrolidone, serum albumin, ficol, maltose, polyvinylalcohol (PVA), ethylene glycol, glycerol, dimethyl sulfoxide (DMSO) and the like. In some embodiments, a cryoprotectant suitable for use in the cryopreservation mediums herein can be DMSO. In some examples, cryopreservation mediums herein can have about 0.5% DMSO to about 90% DMSO, about 5% DMSO to about 85% DMSO, or about 10% DMSO to about 80% DMSO by weight of the composition. In some examples, cryopreservation mediums herein can have about 0.5% DMSO, about 5% DMSO, about 10% DMSO, about 15% DMSO, about 20% DMSO, about 25% DMSO, about 30% DMSO, about 40% DMSO, about 50% DMSO, about 60% DMSO, about 70% DMSO, about 80% DMSO, or about 90% DMSO by weight of the composition. In some examples, a cryoprotectant for use in the compositions herein can be DMSO at a concentration of about 10%.

In some embodiments, a cryopreservation medium herein can contain serum, serum replacement medium, or any combination thereof. In some embodiments, serum for use herein can be a complex mix of albumins, growth factors, growth inhibitors, and the like. In some embodiments, serum for use in the compositions herein can be at a concentration of between about 1% to 50% (e.g., about 1%, about 5%, about 10%, about 20%, about 30%, about 40%, about 50%). It is appreciated that a "high serum" thawing method may be advantageous to minimize ice crystal formation where a non-isotonic buffer is used because of the need for high lipid content in this process. In some embodiments, serum for use in the compositions herein can be at a concentration of between about 1% to 5%. It is appreciated that this "low serum" thawing method may be used where an isotonic buffer is used because high lipid content is not required.

In some embodiments, a serum replacement medium may be one or more of GIBCO's Knockout Serum Replacement Medium and Kubota's medium, optionally supplemented with albumin, which in turn can optionally be human serum-derived albumin. In some embodiments, a serum replacement medium for use in the compositions herein can have albumin at a concentration of between about 1% to 5%.

In some embodiments, serum for use in the compositions herein can be human serum, newborn calf serum and horse serum, fetal bovine serum, or any combination thereof. In some examples, serum for use in the compositions herein can be fetal bovine serum (FBS). In some embodiments, serum for use in the compositions herein can be FBS at a concentration of between about 1% to 50% (e.g., about 1%, about 5%, about 10%, about 20%, about 30%, about 40%, about 50%). In some examples, serum for use in the compositions herein can be FBS at a concentration of about 40%.

In some embodiments, a cryopreservation medium herein can be provided as an aqueous solution. In some embodiments, a cryopreservation medium herein can be a balanced electrolyte solution. In some examples, a cryopreservation medium herein can be a saline solution. In some embodiments, a solution for use in the compositions herein can be about 10% to about 90% (e.g., about 10%, about 20%, about 30%, about 40%, about 50%, about 60%, about 70%, about 80%, about 90%) of the total volume. Solutions for use herein can include, but are not limited to phosphate buffered saline (PBS), Dulbecco's Modified Eagle's Medium (DMEM), IDMEM (Iscove's DMEM with L-glutamine and 25 mM HEPES), Minimum Essential Media (MEM), RPMI (Roswell Park Memorial Institute) 1640, McCoy's 5A medium (or RPMI 1630), Ham's F-12, Normosol R, lactated Ringer's, Hank's balanced salt solution (HBSS), and any combinations thereof.

In some examples, a cryopreservation medium herein can be a RPMI solution. In some embodiments, a solution for use in the compositions herein can be an RPMI solution at about 10% to about 90% (e.g., about 10%, about 20%, about 30%, about 40%, about 50%, about 60%, about 70%, about 80%, about 90%) of the total volume.

In some embodiments, a cryopreservation medium herein can contain auxiliary substances, such as, water, saline, pH buffering agents, carriers or excipients, other stabilizers and/or buffers or other reagents. In some embodiments, a cryopreservation medium herein can have one or more of the following so as to ensure a buffering solution: Sodium Chloride, Potassium Chloride, Magnesium Sulfate, Potassium Phosphate, Calcium Chloride, and Sodium Bicarbonate.

In some embodiments, a cryopreservation medium herein can be provided as an aqueous solution having physiological pH. In some embodiments, a cryopreservation medium herein described herein can have pH of between about 6.9 and about 7.5, or between about 7.2 and about 7.4.

In some embodiments, a cryopreservation medium herein can have one or more energy substrates. In some embodiments, a cryopreservation medium herein can have one or more energy substrates at a total amount of about 0.5 g/L to about 5 g/L (e.g., about 0.5 g/L, about 1 g/L, about 1.5 g/L, about 2 g/L, about 2.5 g/L, about 3 g/L, about 3.5 g/L, about 4 g/L, about 4.5 g/L, about 5 g/L). In some embodiments, compositions herein can have pyruvate as an energy substrate. In some embodiments, compositions herein can have one or more energy substrates derived from carbohydrates. Non-limiting examples of carbohydrates suitable for use herein can be glucose, galactose, maltose, fructose, and the like.

In some embodiments, a cryopreservation medium herein can have one or more amino acids. In some embodiments, a cryopreservation medium herein can have one or more amino acids at a total amount of about 0.1 mM to about 15 mM (e.g., about 0.1 mM, about 0.5 mM, about 1 mM, about 1.5 mM, about 2 mM, about 2.5 mM, about 3 mM, about 3.5 mM, about 4 mM, about 4.5 mM, about 5 mM, about 6 mM, about 7 mM, about 8 mM, about 9 mM, about 10 mM, about 12 mM, about 13 mM, about 14 mM, about 15 mM). In some embodiments, a cryopreservation medium herein can have one or more essential amino acids. As used herein, an "essential" amino acid refers to an amino acid that cannot be made by the cultured cells. Non-limiting examples of essential amino acids suitable for use herein can include L-Arginine, L-Cysteine, L-Cystine, L-Glutamine, L-Histidine, L-Isoleucine, L-Leucine, L-Lysine, L-Methionine, L-Phenylalanine, L-Threonine, L-Tryptophan, L-Tyrosine, and L-Valine. In some embodiments, a cryopreservation medium herein can have one or more non-essential amino acids. Non-limiting examples of non-essential amino acids suitable for use herein can include glycine and L-Alanine In some embodiments, a cryopreservation medium herein can have one or more vitamins. Non-limiting examples of vitamins suitable for use herein can include B group vitamins (e.g., B1, B12, B2, B3, B4, B5, B6, B7), vitamin A, vitamin E, riboflavin, thiamine, biotin, and the like.

In some embodiments, a cryopreservation medium herein can have one or more lipids and/or fatty acids. Non-limiting examples of lipids and/or fatty acids suitable for use herein can include cholesterol, steroids, and the like.

In some embodiments, a cryopreservation medium herein can have one or more trace elements. Non-limiting examples of trace elements suitable for use herein can include zinc, copper, selenium, tricarboxylic acid intermediates, and the like.

In some embodiments, a cryopreservation medium herein can have one or more antibiotics. Non-limiting examples of antibiotics suitable for use herein can include penicillin, streptomycin, puromycin, neomycin, hygromycin, and any combination thereof.

In some embodiments, a cryopreservation medium herein can have one or more ADAM17 (TACE) inhibitors. ADAM metallopeptidase domain 17 (ADAM17), also called TACE (tumor necrosis factor-α-converting enzyme), is a 70-kDa enzyme that belongs to the ADAM protein family of disintegrins and metalloproteases. In some embodiments, an inhibitor of ADAM17 can include any biomolecule(s) capable of decreasing ADAM17 gene expression, decreasing ADAM17 protein expression, decreasing ADAM17 activity, decreasing activity of a downstream signaling target of ADAM17, or a combination thereof. In some embodiments, an inhibitor of ADAM17 can include any biomolecule(s) capable of achieving an at least a 50% reduction in ADAM17 protease activity. In some aspects, biomolecule(s) capable of inhibiting ADAM17 can be a peptide, an antibody, a small molecule, a compound, an oligo, a nucleic acid molecule, or a combination thereof.

In some embodiments, an inhibitor of ADAM17 for use in the compositions herein can be a small molecule. Non-limiting examples of inhibitors of ADAM17 suitable for use herein can include nitroarginine analog A, GW3333, TMI-1, BMS-561392, DPC-3333, TMI-2, BMS-566394, TMI-005, apratastat, GW4459, W-3646, IK-682, GI-5402, GI-245402, BB-2983, DPC-A38088, DPH-067517, R-618, INCB003619, INCB007839, INCB7839, TAPI-0, TAPI-1, TAPI-2, ZLDI-8, CH-138, and any combination thereof. In some embodiments, compositions herein can have an ADAM17 inhibitor at about 10 nM to about 100 μM. In some embodiments, compositions herein can have an ADAM17 inhibitor at about 10 nM, about 20 nM, about 50 nM, about 80 nM, about 100 nM, about 500 nM, about 1 μM, about 5 μM, about 10 μM, about 20 μM, about 50 μM, or about 100 μM.

In some embodiments, an ADAM17 inhibitor for use in the compositions herein can be TAPI-2. In some embodiments, compositions herein can have TAPI-2 at about 10 μM to about 50 μM. In some embodiments, compositions herein can have TAPI-2 at about 10 μM, about 15 μM, about 20 μM, about 25 μM, about 30 μM, about 35 μM, about 40 μM, about 45 μM, or about 50 μM.

In some embodiments, cryopreservation compositions can be prepared in a concentrated form. In some embodiments, cryopreservation compositions can be prepared in a concentrated form suitable for dilution. In some embodiments, cryopreservation compositions prepared in a concentrated form can be suitable for at least about 1×, about 2×, about 3×, about 4×, about 5×, about 6×, about 7×, about 8×, about 9×, or about 10× dilution. In some embodiments, diluted cryopreservation compositions can be used to wash cells before cryopreservation or after cryopreservation. In some embodiments, a concentrated form of the cryopreservation compositions can have a concentration of an ADAM17 inhibitor that is higher than what is needed to achieve an at least a 50% reduction in ADAM17 protease activity. In some embodiments, a concentrated form of the cryopreservation compositions can have at least about 1×, about 2×, about 3×, about 4×, about 5×, about 6×, about 7×, about 8×, about 9× or about 10× more ADAM17 inhibitor than what is needed to achieve an at least a 50% reduction in ADAM17 protease activity. In some examples, a concentrated form of a cryopreservation composition herein can have about 10 μM, about 20 μM, about 30 μM, about 40 μM, about 50 μM, about 60 μM, about 70 μM, about 80 μM, about 90 μM, or about 100 μM of an ADAM17 inhibitor.

In certain embodiments, the present disclosure provides systems for use in the cryopreservation of one or more cell therapies. In some embodiments, a system for use in the cryopreservation of cell therapies can include a cryopreservation medium for the cryopreservation of one or more cell types and a washing medium for use after cryopreservation.

In some embodiments, systems herein can include any one of the cryopreservation mediums disclosed herein. In some embodiments, systems herein can include any one of the cryopreservation mediums disclosed herein wherein the cryopreservation medium includes at least one inhibitor of ADAM17. In some embodiments, systems herein can include any one of the cryopreservation mediums disclosed herein wherein the cryopreservation medium includes at least one small molecule inhibitor of ADAM17. In some embodiments, systems herein can include any one of the cryopreservation mediums disclosed herein wherein the cryopreservation medium includes at least one small molecule inhibitor of ADAM17 at a concentration capable of an at least a 50% reduction in ADAM17 protease activity in the cells. In some embodiments, systems herein can include any one of the cryopreservation mediums disclosed herein wherein the cryopreservation medium includes at least one small molecule inhibitor of ADAM17 at a concentration of about 10 nM to about 100 μM, or about 10 μM to about 50 μM.

In some embodiments, systems herein can include a washing medium for use after cryopreservation. In some embodiments, a washing medium for use herein can be a dilution of any one of the cryopreservation mediums disclosed herein. In some embodiments, a washing medium for use herein can be a dilution of any one of the cryopreservation mediums disclosed herein wherein the cryopreservation medium includes at least one inhibitor of ADAM17. In some embodiments, a washing medium for use herein can be a dilution of any one of the cryopreservation mediums disclosed herein wherein the cryopreservation medium includes at least one small molecule inhibitor of ADAM17. In some embodiments, a washing medium for use herein can be a dilution of any one of the cryopreservation mediums disclosed herein wherein the diluted cryopreservation medium yields a washing medium that includes at least one small molecule inhibitor of ADAM17 at a concentration capable of an at least a 50% reduction in ADAM17 protease activity in the cells. In some embodiments, a washing medium for use herein can be a dilution of any one of the cryopreservation mediums disclosed herein wherein the diluted cryopreservation medium yields a washing medium that includes at least one small molecule inhibitor of ADAM17 at a concentration of about 10 nM to about 100 μM, or about 10 μM to about 50 μM.

In some embodiments, a washing medium for use herein can be any one of the aqueous solutions disclosed herein wherein the aqueous solution includes at least inhibitor of ADAM17. In some embodiments, a washing medium for use herein can be any one of the aqueous solutions disclosed herein wherein the aqueous solution includes at least one small molecule inhibitor of ADAM17. In some embodiments, a washing medium for use herein can be any one of the aqueous solutions disclosed herein wherein the aqueous solution includes at least one small molecule inhibitor of ADAM17 at a concentration capable of an at least a 50% reduction in ADAM17 protease activity in the cells. In some embodiments, a washing medium for use herein can be any one of the aqueous solutions disclosed herein wherein the aqueous solution includes at least one small molecule inhibitor of ADAM17 at a concentration of about 10 nM to about 100 μM, or about 10 μM to about 50 μM.

III. Methods

Aspects of the present disclosure provide for methods useful in the freezing and thawing of cell therapies. In some embodiments, methods useful in the freezing and thawing of cell therapies can include use of any one of the compositions disclosed herein.

In some embodiments, compositions herein can be used to cryopreserve one or more cell types that make up a clinical grade cellular products. In some embodiments, compositions herein can be used to cryopreserve one or more multipotent cells. In some examples, multipotent cells to be cryopreserved herein can be adult stem cells selected from the group consisting of bone marrow, skin stem cells, ocular stem cells, neural stem cells cardiac stem cells, and any combination thereof. In some embodiments, stem cells to be cryopreserved herein can be embryonic stem cells, mesenchymal stem cells, hematopoietic stem cells, and any combination thereof. In some embodiments, cells to be cryopreserved herein can be one or more progenitor cells. As used herein, progenitor cells are descendants of stem cells that then further differentiate to create one or more specialized cell types. In some examples, progenitor cells to be cryopreserved herein can be frozen before differentiation, after differentiation, or at any stage during the differentiation process. In some embodiments, cells to be cryopreserved herein can be cells prepared for mature cell transplantation. Non-limited examples of cells prepared for mature cell transplantation can include cardiomyocytes, islet cells, chondrocytes, and the like.

In some embodiments, cells to be cryopreserved using methods herein can be used on at least one immune cell. As used herein an "immune cell" refers to a cell of the immune system. Immune cells can be categorized as lymphocytes, neutrophils, granulocytes, mast cells, monocytes/macrophages, and dendritic cells. In some aspects, compositions disclosed herein can include at least one lymphocyte. In some aspects, lymphocytes can be T-cells, B-cells, and NK cells are categorized as lymphocytes. In other aspects, an immune cell disclosed herein can be cytotoxic lymphocyte. As used herein, a "cytotoxic lymphocyte" refers to a lymphocyte capable cytolysis. For example, but not limited to, a cytotoxic lymphocyte can be capable of killing cancer cells, cells that are infected (particularly with viruses), and cells that are damaged in one or more other ways. In some aspects, a cytotoxic lymphocyte can be a natural killer (NK) cell, a CD4 T cell, or a CD8 T cell.

In various embodiments, an immune cell can be isolated from a subject. In some aspects, an immune cell can be isolated from peripheral blood, umbilical cord blood, and/or bone marrow. In other aspects, an immune cell can be isolated from peripheral blood mononuclear cells (PBMCs). In still other aspects, an immune cell can be isolated from a leukapheresis sample. In some aspects, an immune cell can be isolated from Tumor-infiltrated lymphocytes, Tissue-infiltrated lymphocytes, Lymph nodes, Thymus, Secondary lymphoid organs, or any combination thereof.

In various embodiments, an immune cell can be isolated from autologous peripheral blood, umbilical cord blood, bone marrow, PBMCs, and/or leukapheresis sample. As used herein, the term "autologous" refers to peripheral blood, umbilical cord blood, bone marrow, PBMCs, and/or leukapheresis sample obtained from the same subject to be treated with a cellular therapy cryopreserved with the compositions disclosed herein. In other embodiments, an immune cell can be isolated from allogeneic peripheral blood, umbilical cord blood, bone marrow, PBMCs, and/or leukapheresis sample. As used herein, the term "allogeneic" refers to peripheral blood, umbilical cord blood, bone marrow, PBMCs, and/or leukapheresis sample obtained from a different subject of the same species as the subject to to be treated with a cellular therapy cryopreserved with the compositions disclosed herein. In some aspects, an immune cell can be isolated from haploidentical allogeneic peripheral blood, umbilical cord blood, bone marrow, PBMCs, and/or leukapheresis sample.

In some embodiments, cells to be cryopreserved herein can be used in one or more immune cell therapies. In some embodiments, one or more immune cells to be cryopreserved herein can be used in one or more immune cell therapies. As used herein, the term "immune cell therapy" or "immunotherapy" refers to a therapeutic approach of activating or suppressing the immune system for the treatment of disease. In various embodiments, an immune cell therapy cryopreserved using the methods disclosed herein encompasses adoptive cell therapy. As used herein, the term "adoptive cell therapy" refers to the transfer of ex vivo grown immune cells into a subject for treatment of a disease. In some embodiments, one or more immune cells to be cryopreserved herein can be used in one or more immune cell therapies wherein the immune cells can be genetically modified prior to or after cryopreservation. In some examples, cells to be cryopreserved herein can be CAR-T cells, NK cells, engineered TCRs, TIL, Tregs, CAR-Tregs, CAAR-T cells, T cells, monocytes, B lymphocytes, T lymphocytes, which are natural or genetically modified, such as regulatory T lymphocytes, cytotoxic T lymphocytes, helper T lymphocytes, and chimeric antigen receptor (CAR) T lymphocytes, and any combination thereof. In some embodiments, cells to be cryopreserved herein can be cells having at least one surface marker susceptible to being lost during a standard freezing procedure. In some embodiments, cells to be cryopreserved herein can be cells having at least one surface marker selected from CD16, CD62L, CD30, CD40, CD44, IL15Ra, notch expression markers, or any combination thereof.

In some embodiments, methods of cryopreservation using the compositions disclosed herein can preserve cell viability wherein the cells are to be frozen and thawed at least once before use. In some embodiments, methods of cryopreservation using the compositions disclosed herein can preserve cell viability by at least about 10% to at least about 100% (e.g., at least about 10%, about 20%, about 30%, about 40%, about 50%, about 60%, about 70%, about 80%, about 90%, about 95%, about 99%, about 100%) wherein the cells are to be frozen and thawed at least once before use.

In some embodiments, methods of cryopreservation using the compositions disclosed herein can preserve a cell therapy's Antibody Dependent Cell Cytotoxicity (ADCC) against one or more target cells wherein the cells are to be frozen and thawed at least once before use. In some embodiments, methods of cryopreservation using the compositions disclosed herein can preserve a cell therapy's ADCC against one or more target cells by at least about 10% to at least about 100% (e.g., at least about 10%, about 20%, about 30%, about 40%, about 50%, about 60%, about 70%, about 80%, about 90%, about 95%, about 99%, about 100%) wherein the cells are to be frozen and thawed at least once before use.

In some embodiments, methods of cryopreservation using the compositions disclosed herein can preserve at least one surface marker susceptible to being lost during a standard freezing procedure on the cells surface wherein the cells are to be frozen and thawed at least once before use. In some embodiments, methods of cryopreservation using the compositions disclosed herein can preserve at least one surface marker susceptible to being lost during a standard freezing procedure on the cells surface by at least about 10% to at least about 100% (e.g., at least about 10%, about 20%, about 30%, about 40%, about 50%, about 60%, about 70%, about 80%, about 90%, about 95%, about 99%, about 100%) wherein the cells are to be frozen and thawed at least once before use.

In some embodiments, methods of cryopreservation using the compositions disclosed herein can preserve at least one cell surface marker selected from CD16, CD62L, CD30, CD40, CD44, IL15Ra, notch expression markers, or any combination thereof wherein the cells are to be frozen and thawed at least once before use. In some embodiments, methods of cryopreservation using the compositions disclosed herein can preserve at least one cell surface marker selected from CD16, CD62L, CD30, CD40, CD44, IL15Ra, notch expression markers, or any combination thereof by at least about 10% to at least about 100% (e.g., at least about 10%, about 20%, about 30%, about 40%, about 50%, about 60%, about 70%, about 80%, about 90%, about 95%, about 99%, about 100%) wherein the cells are to be frozen and thawed at least once before use.

In some examples, methods of cryopreservation using the compositions disclosed herein can preserve the surface marker CD16 on NK cells, macrophages, activated monocytes, mast cells, neutrophils, and the combination thereof wherein the cells are to be frozen and thawed at least once before use. In some examples, methods of cryopreservation using the compositions disclosed herein can preserve the surface marker CD16 on NK cells, macrophages, activated monocytes, mast cells, neutrophils, and the combination thereof by at least about 10% to at least about 100% (e.g., at least about 10%, about 20%, about 30%, about 40%, about 50%, about 60%, about 70%, about 80%, about 90%, about 95%, about 99%, about 100%) wherein the cells are to be frozen and thawed at least once before use.

In some examples, methods of cryopreservation using the compositions disclosed herein can preserve the surface marker CD62L on native T cells, engineered T cells, native Regulatory T cells (Tregs), engineered T cells, and the combination thereof wherein the cells are to be frozen and thawed at least once before use. In some examples, methods of cryopreservation using the compositions disclosed herein can preserve the surface marker CD62L on native T cells, engineered T cells, native Regulatory T cells (Tregs), engineered T cells, and the combination thereof by at least about 10% to at least about 100% (e.g., at least about 10%, about 20%, about 30%, about 40%, about 50%, about 60%, about 70%, about 80%, about 90%, about 95%, about 99%, about 100%) wherein the cells are to be frozen and thawed at least once before use.

In some embodiments, compositions herein can be used as a cryopreservation medium for the cryopreservation of one or more body fluids. Non-limiting examples of body fluids that may be cryopreserved using a cryopreservation medium herein can include platelets, whole blood, red blood cells, plasma, cord blood, stem cells, mesenchymal stromal/stem cells, other biologicals, and/or combinations thereof. In some examples, the body fluid may be human or animal body fluid for use in humans or animals. In some examples, a body fluid can be platelets in plasma that have been collected from healthy volunteer allogeneic donors.

In some embodiments, methods of cryopreservation using the compositions disclosed herein, can preserve a body fluid sample collected from a subject wherein the sample is to be frozen and thawed at least once before subjected the sample to at least one diagnostic test. Upon thawing an aliquot, ADAM17 can cause shedding of CD16 and CD62L and its other target proteins whereas a medical professional may presume the investigated cells are in an activated state instead of a resting or memory state when assessing the diagnostic test results. In some embodiments, methods of cryopreservation using the compositions disclosed herein can preserve the activated state of cells in a biological sample collected from a subject wherein the sample is to be frozen and thawed at least once before subjected the sample to at least one diagnostic test. In some embodiments, methods of cryopreservation using the compositions disclosed herein can preserve the activated state of cells in a biological sample by at least about 10% to at least about 100% (e.g., at least about 10%, about 20%, about 30%, about 40%, about 50%, about 60%, about 70%, about 80%, about 90%, about 95%, about 99%, about 100%) wherein the sample is to be frozen and thawed at least once before subjected the sample to at least one diagnostic test.

In some embodiments, methods of cryopreservation using the compositions disclosed herein can preserve the activated state of cells in a biological sample collected from a subject wherein the sample is to be frozen and thawed at least once, at least twice, at least three times, at least four times, at least five times, or at least ten times before subjected the sample to at least one diagnostic test. In some embodiments, methods of cryopreservation using the compositions disclosed herein can preserve the activated state of cells in a biological sample by at least about 10% to at least about 100% (e.g., at least about 10%, about 20%, about 30%, about 40%, about 50%, about 60%, about 70%, about 80%, about 90%, about 95%, about 99%, about 100%) wherein the sample is to be frozen and thawed at least once, at least twice, at least three times, at least four times, at least five times, or at least ten times before subjected the sample to at least one diagnostic test.

In some embodiments, methods of cryopreservation using the compositions disclosed herein can be used to freeze about $0.5 \times 10^6$ cells/milliliter (ml) to about $1 \times 10^7$ cells/ml. In some embodiments, methods of cryopreservation using the compositions disclosed herein can be used to freeze about $0.5 \times 10^6$ cells/ml, about $1 \times 10^6$ cells/ml, about $2 \times 10^6$ cells/ml, about $3 \times 10^6$ cells/ml, about $4 \times 10^6$ cells/ml, about $5 \times 10^6$ cells/ml, about $6 \times 10^6$ cells/ml, about $7 \times 10^6$ cells/ml, about $8 \times 10^6$ cells/ml, about $9 \times 10^6$ cells/ml, or about $1 \times 10^7$ cells/ml.

In some embodiments, methods of cryopreservation using the compositions disclosed herein can be used to freeze a cell suspension. In some embodiments, cells suspended in a cryopreservation composition disclosed herein can be irradiated (e.g., irradiated prior to freezing, irradiated in the cryogenic frozen state, or irradiated after thawing). In some embodiments, a cell suspension can be frozen in the presence of a cryopreservation composition disclosed at a temperature of from e.g., from about −200° C. to a temperature of about −35° C., from about −180° C. to a temperature of about 35° C., from about −150° C. to a temperature of about −35° C., from about −200° C. to a temperature of about −50° C., from about −200° C. to a temperature of about −60° C. and the like. In some embodiments, frozen cells can be stored at a temperature below which any recrystallization can occur, e.g., the temperature below the glass transition of pure water (e.g., less than about −135° C.). Standard methods known in the art can be used to freeze cells suspended in a cryopreservation composition disclosed herein including, but not limited to, containers holding the cells suspended in a cryopreservation composition disclosed herein wherein the containers can be immersed in, a solid carbon dioxide and alcohol mixture, or in liquid nitrogen. In some examples, containers holding cells suspended in a cryopreservation composition disclosed herein can be placed directly in a freezer, which is set at a desired temperature, e.g., about equal to or less than about −35° C. In some examples, cryogenic equipment can be used to freeze cells suspended in a cryopreservation composition disclosed herein, e.g., a programmed freezer or rate-controlled freezer (Cryo-Med, Mt. Clemens, Mich. or UTL-80, Neslab Instruments Inc., Portsmouth, N. H.). In some examples, frozen cells can be transferred to a freezer, which is set at a desired temperature, e.g., about equal to or less than about −35° C. In some examples, liquid nitrogen (the liquid and/or gas phase) can also be used to freeze and store the cells. Other freezing methods and apparatus known in the art can also be used in practicing the methods described herein. In some examples, the frozen suspension can be frozen at a temperature of from about −200° C. to a temperature of about −35° C. In some examples, frozen cells in a cryopreservation composition disclosed herein can be stored frozen for at least 1 day, at least 1 week, at least 1 month, at least 3 months, at least 6 months, at least 9 months, at least 1 year, at least 2 years, at least 5 years, or at least 10 years. One of skill in the art can appreciate that the duration of storage time will depend on the frozen cell type (include "cells" in samples of bodily fluids) and optimized as such. In some embodiments, frozen cells in a cryopreservation composition disclosed herein can be stored frozen for up to about 1 day to up to about 10 years or more.

In some embodiments, methods herein can further include thawing the frozen cell suspension. In some embodiments, a container containing frozen cells in a cryopreservation composition disclosed herein can be thawed in a liquid (e.g., water) bath having a temperature up to about 42° C. In some embodiments, a container containing frozen cells in a cryopreservation composition disclosed herein can be thawed in a liquid (e.g., water) bath having a temperature between about 10° C. and about 42° C. In some examples, a container containing frozen cells in a cryopreservation composition disclosed herein can be thawed in a liquid (e.g., water) bath having a temperature of about 37° C. In some examples, frozen cells can also be thawed by mixing the cells with thawed cryopreservation medium. In some examples, frozen cells can be thawed using a programmed freezer.

In some embodiments, thawing a container containing frozen cells in a cryopreservation composition disclosed herein can be done in a step-wise method. In some embodiments, thawing a container containing frozen cells in a cryopreservation composition disclosed herein can thawed at a rate between about 10° C. and about 40° C. per minute, between about 20° C. and about 40° C. per minute, or about 30° C. per minute.

In some embodiments, thawed cells can be returned, delivered, or transferred to a subject in need thereof. The cells may be delivered to the tissue site from which they were obtained or to another site appropriate to the therapeutic regimen. If desired, the cells can be grafted onto a tissue, skin, organ, or body system of interest in the subject using standard and well-known grafting techniques or delivered to the blood or lymphatic system using standard delivery or transfusion techniques. Such delivery, administration, or transfer of thawed cells are typically made by using one or more of the routes or modes of administration described herein and known in the art. In one aspect, the amount of thawed cells administered can be sufficient and effective to treat the disease or condition at the site or tissue system. The thawed cells can be administered, for example, intramuscularly, intradermally, subdermally, subcutaneously, orally, intraperitoneally, intrathecally, intravenously, or placed within a cavity of the body (including, e.g., during surgery), or by inhalation or vaginal or rectal administration.

In some embodiments, the thawed cells can be washed to remove the cryopreservation composition before administration to a subject in need thereof. In some embodiments, the thawed cells can be washed to remove the cryopreservation composition before administration to a subject in need thereof wherein the wash medium is supplemented with at least one ADAM17 inhibitor. In some embodiments, the thawed cells can be diluted to lower the concentration of the cryopreservation composition before administration to a subject in need thereof. In some embodiments, the thawed cells can be administered to a subject in need thereof without removing the cryopreservation composition. In some embodiments, the thawed cells can be washed and/or filtered to remove the ADAM17 inhibitor in the cryopreservation composition before administration to a subject in need thereof. In some embodiments, the thawed cells can be diluted to lower the concentration of ADAM17 inhibitor in the cryopreservation composition before administration to a subject in need thereof. In some embodiments, the thawed cells can be administered to a subject in need thereof without removing the ADAM17 inhibitor from the cryopreservation composition.

In some embodiments, thawed cells can be washed in a washing medium composition described herein. In some embodiments, thawed cells can be washed in a washing medium composition described herein before ex vivo expansion wherein the washing medium composition includes at least one ADAM17 inhibitor. In some examples, thawed cells can be subjected to ex vivo expansion in the presence of a washing medium composition described herein. In some embodiments, an ex vivo expansion of cells can be washed to remove the washing medium composition prior to administering the expanded cells to a subject in need thereof. Methods of administering the expanded cells to a subject in need thereof can be similar to those for administering thawed cells as described herein. In some embodiments, an ex vivo expansion of cells can be administered to a subject in need thereof without removing the washing medium composition prior to administration. In some embodiments, an ex vivo expansion of cells can be administered to a subject in need thereof after diluting the washing medium composition prior to administration.

IV. Kits

The present disclosure may further encompass a kit, wherein the kit includes at least one of the cryopreservation compositions disclosed herein. In various embodiments, a kit may further include at least one culture medium. In some embodiments, a kit may further include at least one washing medium as disclosed herein herein. In some embodiments, a kit may further include at least one inhibitor of ADAM17 as disclosed herein.

In various embodiments, one or more of the presently disclosed cryopreservation compositions can be provided in the form of a kit with one or more containers such as vials or bottles, with each container containing a separate population of reagents and washing reagents employed in an assay. The kit can comprise at least one container for conducting the assay, and/or a buffer, such as an assay buffer or a wash buffer, either one of which can be provided as a concentrated solution, a substrate solution for the detectable or a stop solution. The kit may comprise all components, e.g., reagents, standards, buffers, diluents, etc., which are necessary to perform the methods disclosed herein. The kit may contain instructions for practicing any one of the methods disclosed herein (e.g., freezing of cells and/or thawing of cells). The kit may further contain instructions for determining the presence or amount of any biomarker, label, or reporter of interest for the cell therapy to be frozen according to methods herein. In some examples, instructions can be in paper form or computer-readable form, such as a disk, CD, DVD, or the like, and/or may be made available online.

In other embodiments, a kit may be a single package. As used herein, the term "single package" means that the components of a kit are physically associated in or with one or more containers and considered a unit for manufacture, distribution, sale, or use. Examples of containers include, but are not limited to, bags, boxes, cartons, bottles, packages such as shrink-wrap packages, stapled or otherwise affixed components, or combinations thereof.

In some embodiments, a kit may comprise one or more components to assist with cell expansion as described herein. In some examples, such components may be one or more of the compositions herein. In some examples, such components may further include culture flasks, antibiotics for culture medium, serum for culture medium, a control cell line, reagents for detection of immune cell markers, or a combination thereof.

Having described several variations, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Those skilled in the art will appreciate that the presently disclosed variations teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

EXAMPLES

The following examples are included to demonstrate preferred embodiments of the disclosure. It should be appreciated by those of skill in the art that the techniques disclosed in the examples that follow represent techniques discovered by the inventors to function well in the practice of the present disclosure, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the present disclosure.

Example 1

Cryopreservation is an essential and critical step in the preparation of cellular products either for research or for clinical application. However, the process of cryopreserving live cells can affect the quality of the cellular product and damage the cells if not performed according to validated processes. Even when proper cryopreservation methods are used, cryopreserved cells can lose their original property or phenotype and lose—partially or completely—their function.

Therefore, in this example, NK cells and T cells were examined after thawing. The two key molecules expressed on T cells and NK cells surface, CD62L and CD16 respectively, were lost during the process of cryopreservation and thawing on their respective cell type (i.e. CD16 for NK cells and CD62L for T cells). CD16 is critical for NK-cell function as it is the receptor (FcγR) for antibody and promotes Antibody Dependent Cell Cytotoxicity (ADCC) against target cells (Infected cells, stressed cells, cancer cells) thru binding of antibody-antigen complex. CD62L is also critical in the homing of T cells—including Treg cells—into the lymph nodes and therefore, affects the distribution of T cells in the body for optimal activity. Data herein showed that both cell surface markers are targeted and destroyed by A Desintegrin And Metalloproteinase 17 sheddase (ADAM17), also known as TACE (Tumor Necrosis Factor-Alpha Converting Enzyme).

A freezing medium (FM) was prepared having 50% RPMI, 40% FBS, 10% DMSO. FM was supplemented with the ADAM17 inhibitor TAPI-2 at amounts indicated in this example. Additionally, a wash medium (WM) was prepared having 50% RPMI, 40% FBS, 10% DMSO and supplemented with TAPI-2 at amounts indicated in this example.

Experiments were generally performed using in-vitro NK cells and T cells that were isolated and expanded for 14 days in culture. On day 14 of the culture, the NK cells and T cells were cryopreserved the using FM with or without TAPI-2. Then, cells were thawed using WM with or without TAPI-2.

CD16 expression is maintained in NK cells in presence of TAPI-2. As shown in FIG. 1, NK cells cryopreserved in FM containing TAPI-2 retained expression of CD16 to the same level as prior cryopreservation. FIG. 1 shows that NK cells cryopreserved in FM containing 50 μM of TAPI-2 (50 μM in this experiment), thawed and not washed, were able to maintain CD16 expression immediately after thawing and 2 hours thereafter.

Figure 2:
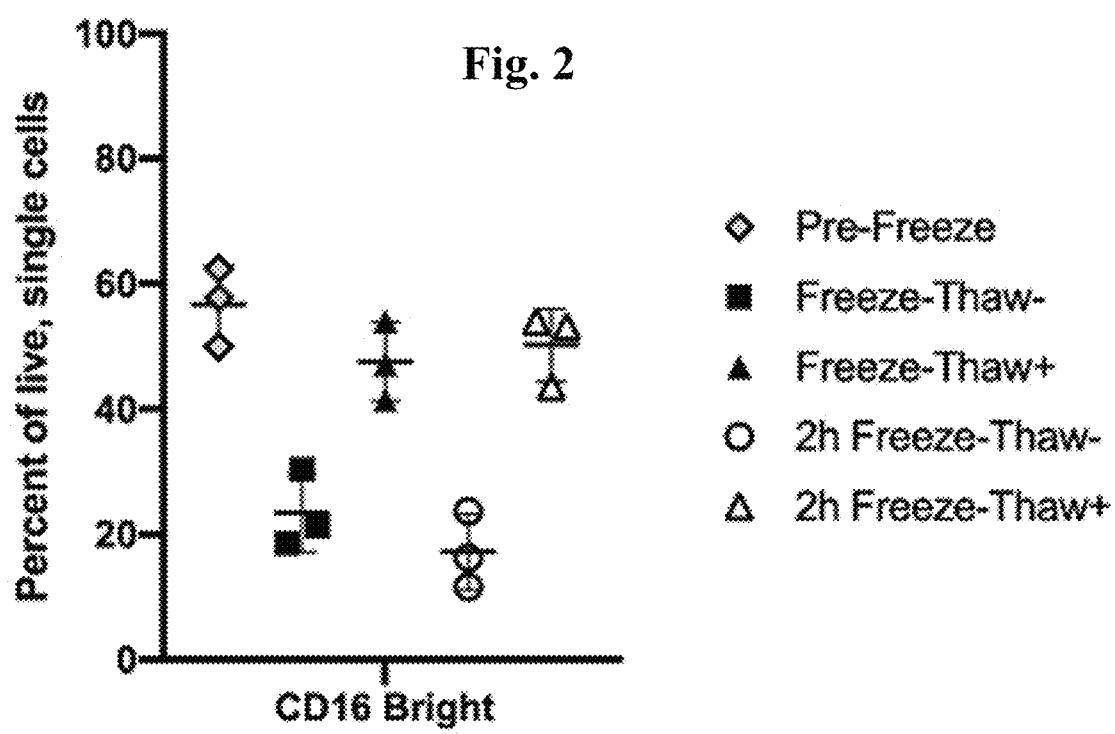
FIG. 2 illustrates an example of NK cells cryopreserved in a freezing medium containing TAPI-2 followed by thawing in a washing medium having TAPI-2 (Thaw+) and not having TAPI-2 (Thaw−) in accordance with certain aspects of the present disclosure.

When NK cells were cryopreserved in freezing media without TAPI-2, only the cells washed with wash media that contained TAPI-2 (10 μM in this experiment and called "Thaw+") showed CD16 expression (FIG. 2).

Figure 3:
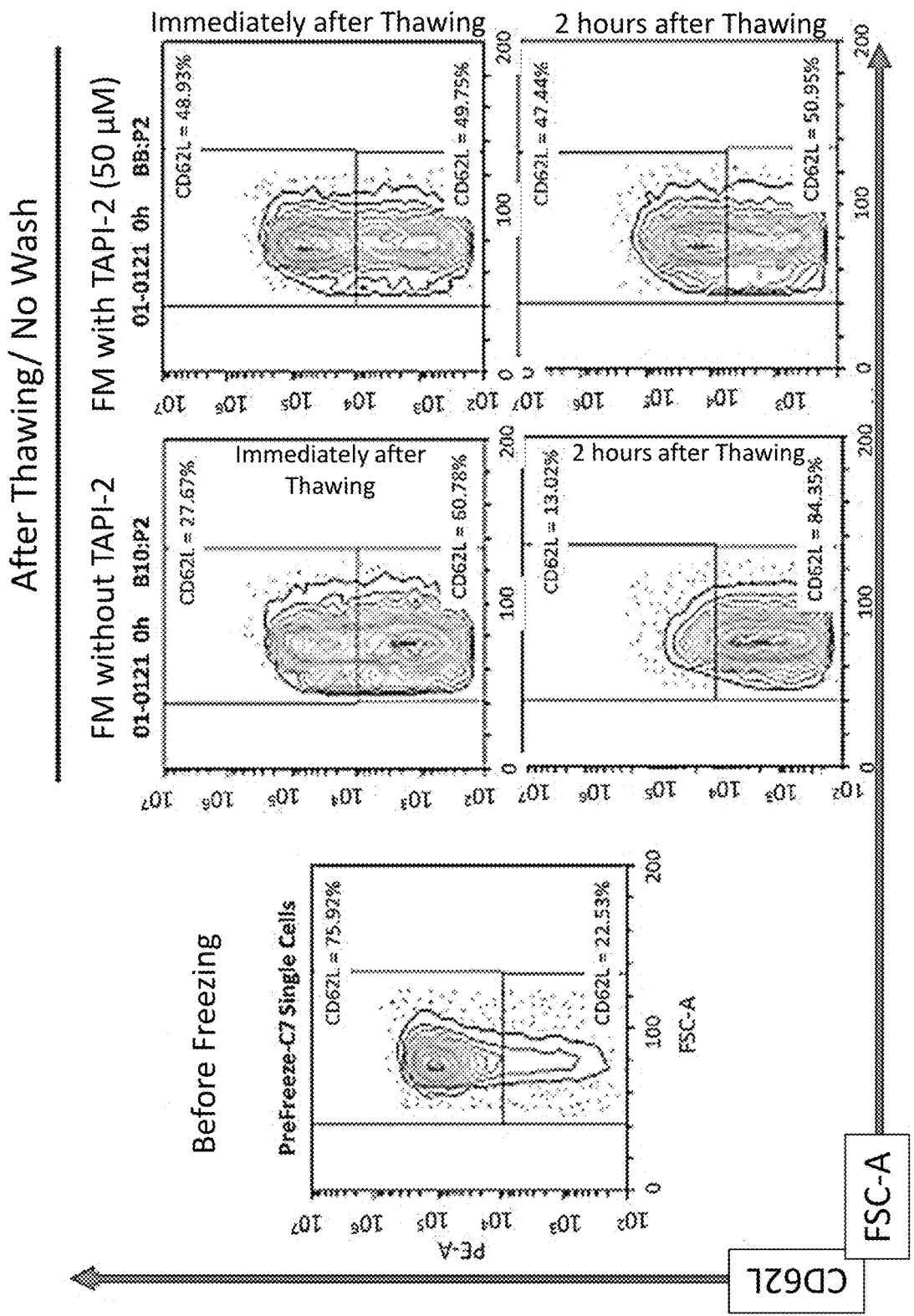
FIG. 3 illustrates an example of T cells cryopreserved in a freezing medium containing TAPI-2 retaining expression of CD62L in accordance with certain aspects of the present disclosure.

CD62L expression is maintained in T cells in presence of TAPI-2. T cells cryopreserved in FM containing TAPI-2 retained expression of CD62L to a level that was equal to that before cells were subjected to cryopreservation. FIG. 3 shows that T cells cryopreserved in FM containing TAPI-2 (50 μM in this experiment), thawed and not washed, were able to maintain CD62L expression immediately after thawing and 2 hours thereafter.

Next, T cells were cryopreserved in freezing media without TAPI-2. As shown in FIG. 4, only the cells washed with wash media (WM) that contained TAPI-2 (10 μM in this experiment and called "Thaw+") showed CD62L expression.

Example 2

Polyclonally activated T cells and expanded NK cells were expanded for 14 and 12 days respectively and cryopreserved using freezing media (FM) with or without TAPI-2 prepared as described in Example 1. Cryovials were then stored in liquid nitrogen tank.

Figure 5A:
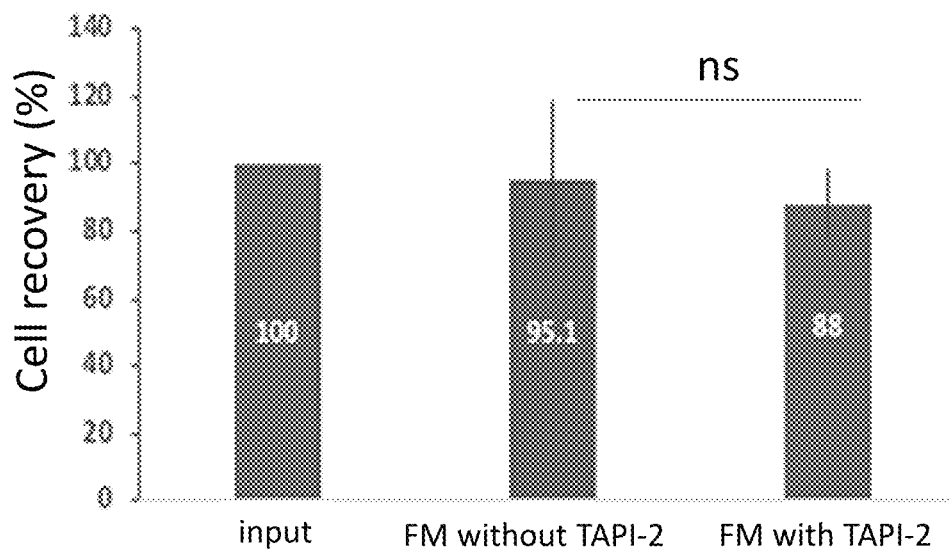
FIGS. 5A and 5B illustrate examples of cell recovery of cryopreserved NK cells and T cells assessed immediately after thawing from a freezing medium having and not having TAPI-2 in accordance with certain aspects of the present disclosure.
Figure 5B:
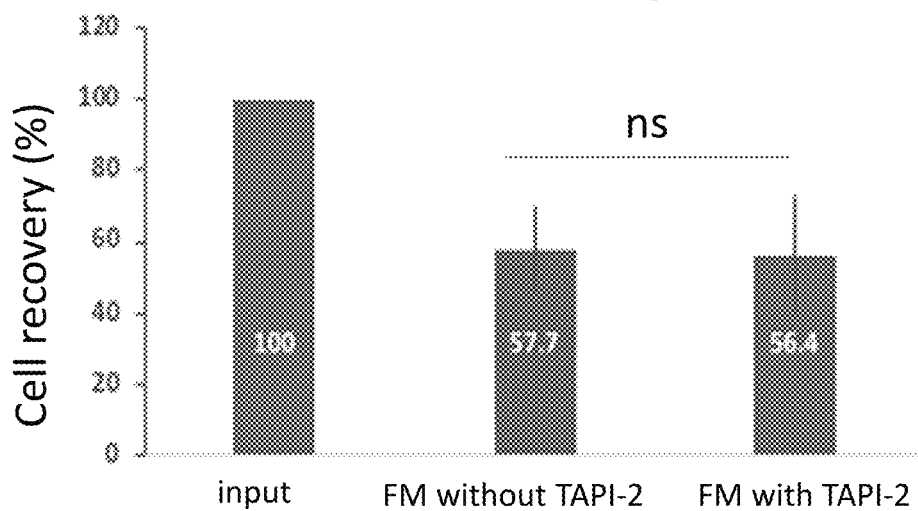

Cryovials were thawed in water bath with cell wash performed, cell recovery (FIGS. 5A-5B) and viability (FIGS. 6A-6B) was assessed immediately after thawing. Cell viability was also assessed 120 minutes after thawing (FIGS. 6A-6B). Trypan blue exclusion method was use to evaluate cell viability.

Figure 7:
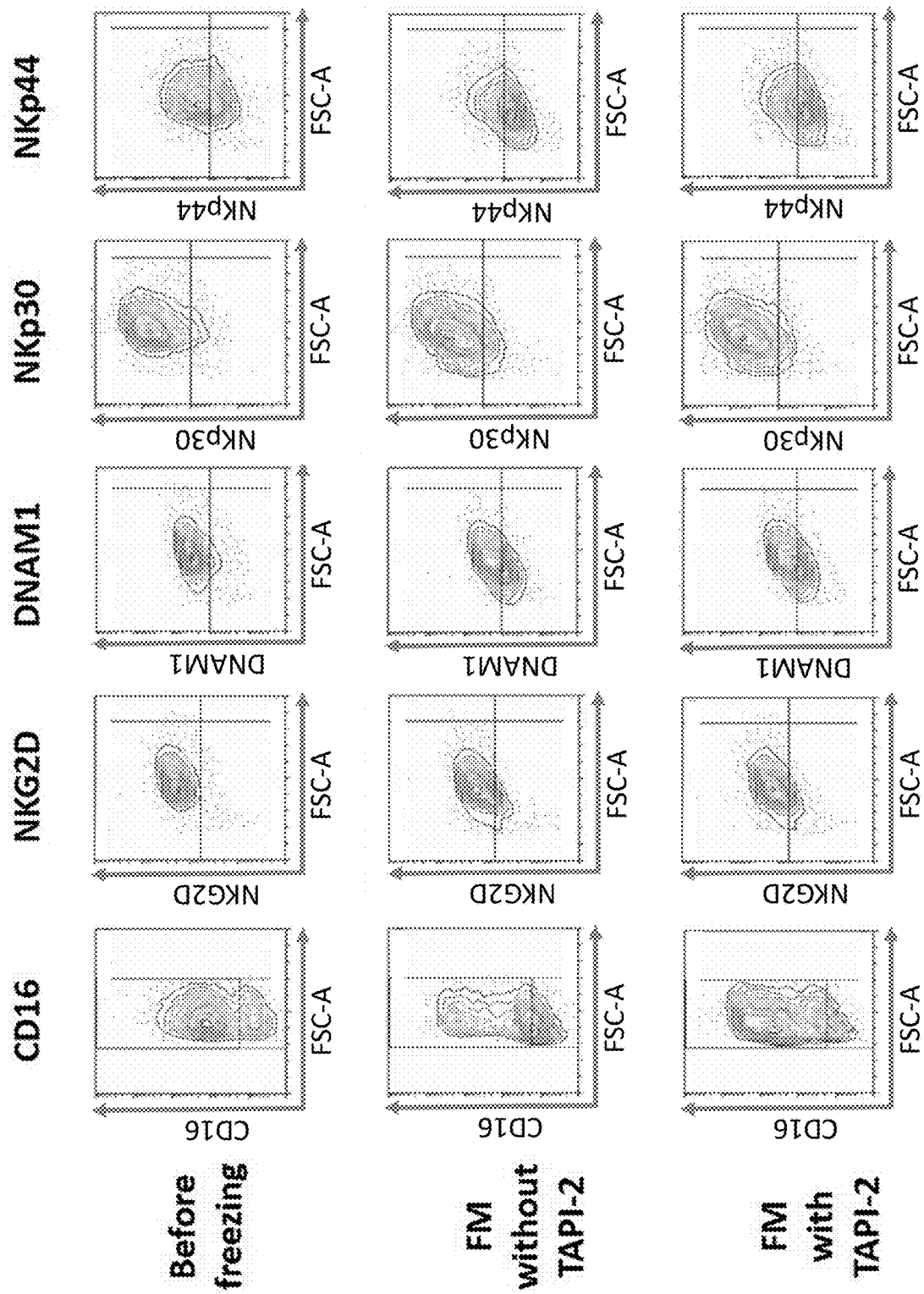
FIG. 7 illustrates an example cell phenotypes of cryopreserved NK cells assessed immediately after thawing from a freezing medium having and not having TAPI-2 in accordance with certain aspects of the present disclosure.

FIG. 7 shows that the NK-cell phenotype, as assessed by flow cytometry, was not affected by the presence of TAPI-2 in the freezing media. However, CD16 expression was significantly diminished when NK cells were cryopreserved without TAPI-2. Flow analysis was performed 120 minutes after thawing (except for NKG2D which expression was analyzed immediately after thawing).

Together, the data showed that the ADAM17 inhibitor TAPI-2 did not negatively affect cell recovery, viability, and phenotype when added to the freezing medium (FM).

What is claimed is:

1. A cryopreservation composition for immune cells, comprising:
    a cryopreservation medium having at least one ADAM metallopeptidase domain 17 (ADAM17) inhibitor,
    wherein the cryopreservation medium is a RPMI solution; and
    wherein the cryopreservation composition preserves the phenotype and/or function of immune cells.

2. The cryopreservation composition of claim 1, wherein the cryopreservation medium further comprises one or more cryoprotectants, a serum, or any combination thereof.

3. The cryopreservation composition of claim 2, wherein the one or more cryoprotectants comprises sucrose, dextran, trehalose, percoll, polyethylene glycol, polyvinyl pyrrolidone, serum albumin, ficol, maltose, polyvinylalcohol (PVA), ethylene glycol, glycerol, dimethyl sulfoxide (DMSO), or any combinations thereof, and/or wherein the serum comprises albumins, growth factors, growth inhibitors, or any combinations thereof.

4. The cryopreservation composition of claim 1, wherein the at least one ADAM17 inhibitor comprises Nitroarginine analog A, GW3333, TMI-1, BMS-561392, DPC-3333, TMI-2, BMS-566394, TMI-005, apratastat, GW4459, W-3646, IK-682, GI-5402, GI-245402, BB-2983, DPC-A38088, DPH-067517, R-618, INCB003619, INCB007839, INCB7839, TAPI-0, TAPI-1, TAPI-2, ZLDI-8, CH-138, or any combinations thereof.

5. The cryopreservation composition of claim 4, wherein the at least one ADAM17 inhibitor is TAPI-2.

6. The cryopreservation composition of claim 1 further comprising water, saline, pH buffering agents, carriers, excipients, stabilizers, buffers, reagents, amino acids, carbohydrates, vitamins, antibiotics, or any combinations thereof.

7. A system for use in the cryopreservation of immune cells, the system comprising:
    a cryopreservation medium having at least one ADAM metallopeptidase domain 17 (ADAM17) inhibitor,
    wherein the cryopreservation medium is a RPMI solution,
    wherein the cryopreservation medium preserves the phenotype and/or function of immune cells; and
    a washing medium optionally having at least one ADAM metallopeptidase domain 17 (ADAM17) inhibitor.

8. The system of claim 7, wherein the cryopreservation medium further comprises one or more cryoprotectants, a serum, or any combination thereof.

9. The system of claim 7, wherein the at least one ADAM17 inhibitor in the cryopreservation medium comprises Nitroarginine analog A, GW3333, TMI-1, BMS-561392, DPC-3333, TMI-2, BMS-566394, TMI-005, apratastat, GW4459, W-3646, IK-682, GI-5402, GI-245402, BB-2983, DPC-A38088, DPH-067517, R-618, INCB003619, INCB007839, INCB7839, TAPI-0, TAPI-1, TAPI-2, ZLDI-8, CH-138, or any combinations thereof.

10. The system of claim 7, wherein the washing medium further comprises one or more cryoprotectants, a serum, or any combination thereof in an aqueous solution.

11. The system of claim 7, wherein the at least one ADAM17 inhibitor in the washing medium comprises Nitroarginine analog A, GW3333, TMI-1, BMS-561392, DPC-3333, TMI-2, BMS-566394, TMI-005, apratastat, GW4459, W-3646, IK-682, GI-5402, GI-245402, BB-2983, DPC-A38088, DPH-067517, R-618, INCB003619, INCB007839, INCB7839, TAPI-0, TAPI-1, TAPI-2, ZLDI-8, CH-138, or any combinations thereof.

12. A method of cryopreserving immune cells, the method comprising:
    freezing a suspension comprising immune cells and the cryopreservation composition of claim 1, and
    wherein the cryopreservation composition preserves the phenotype and/or function of the immune cells for use in a cell therapy.

13. The method of claim 12, further comprising thawing the suspension after freezing and washing thawed suspension in a washing medium, wherein the washing medium optionally having at least one ADAM metallopeptidase domain 17 (ADAM17) inhibitor.

14. The method of claim 12, wherein the immune cells comprises CAR-T cells, NK cells, engineered TCRs, TIL, Tregs, CAR-Tregs, CAAR-T cells, T cells, monocytes, B lymphocytes, T lymphocytes, which are natural or genetically modified, such as regulatory T lymphocytes, cytotoxic T lymphocytes, helper T lymphocytes, chimeric antigen receptor (CAR) T lymphocytes, or any combination thereof.

15. The method of claim 13, wherein the immune cells comprising the thawed suspension have one or more surface markers that were present prior to freezing, the one or more surface markers comprising CD16, CD62L, CD30, CD40, CD44, IL15Ra, notch expression markers, or any combination thereof.

16. The method of claim 13, further comprising administering to a subject in need of immune cell therapy the thawed suspension.

17. The method of claim 12, further comprising thawing the suspension after freezing; washing the thawed suspension in a washing medium having at least one ADAM17 inhibitor; and administering to a subject in need of immune cell therapy the thawed and washed suspension.

18. The cryopreservation composition of claim 1, wherein the immune cells comprises CAR-T cells, NK cells, engineered TCRs, TIL, Tregs, CAR-Tregs, CAAR-T cells, T cells, monocytes, B lymphocytes, T lymphocytes, which are natural or genetically modified, such as regulatory T lymphocytes, cytotoxic T lymphocytes, helper T lymphocytes, chimeric antigen receptor (CAR) T lymphocytes, or any combination thereof.

19. The cryopreservation composition of claim 1, wherein the phenotype of the immune cells comprises the expression of one or more surface markers, and wherein the one or more surface markers comprise CD16, CD62L, CD30, CD40, CD44, IL15Ra, notch expression markers, or any combination thereof.

20. The cryopreservation composition of claim 1, wherein the function of the immune cells comprises Antibody Dependent Cell Cytotoxicity (ADCC) against one or more target cells.

\* \* \* \* \*